(12) United States Patent
Vittorio

(10) Patent No.: US 7,553,015 B2
(45) Date of Patent: Jun. 30, 2009

(54) SPECTACLES, PARTICULARLY OF THE TYPE WITHOUT-LENS-CARRYING RIMS

(75) Inventor: Tabacchi Vittorio, Pieve di Cadore (BL) (IT)

(73) Assignee: Safilo Societa Azionaria Fabbrica Italiana Lavorazione Occhiali, Pieve Di Cadore (BL) (IT)

(*) Notice: Subject to any disclaimer, the term of this patent is extended or adjusted under 35 U.S.C. 154(b) by 188 days.

(21) Appl. No.: 11/663,442

(22) PCT Filed: Sep. 30, 2004

(86) PCT No.: PCT/IT2004/000539
§ 371 (c)(1), (2), (4) Date: Mar. 20, 2007

(87) PCT Pub. No.: WO2006/035467
PCT Pub. Date: Apr. 6, 2006

(65) Prior Publication Data
US 2007/0291222 A1   Dec. 20, 2007

(51) Int. Cl.
*G02C 1/02* (2006.01)

(52) U.S. Cl. .................... 351/110; 351/153; 16/228
(58) Field of Classification Search .............. 351/41, 351/110, 124, 131–133, 153; 16/228
See application file for complete search history.

(56) References Cited

U.S. PATENT DOCUMENTS

| 5,764,330 A * | 6/1998 | Simioni ............ 351/41 |
| 6,007,199 A | 12/1999 | Yang et al. |
| 6,786,594 B1 | 9/2004 | Lucas et al. |
| 7,048,373 B2 * | 5/2006 | Yamaguchi et al. ..... 351/110 |
| 2002/0008842 A1 | 1/2002 | Tiberghien et al. |
| 2002/0135732 A1 * | 9/2002 | Fujita .............. 351/110 |

* cited by examiner

*Primary Examiner*—Huy K Mai
(74) *Attorney, Agent, or Firm*—RatnerPrestia

(57) ABSTRACT

A description is given of spectacles including at least one lens, at least one lug for the articulation of an arm of the spectacles, which lug is connected directly to the lens, and at least one hinge device between the lug and the arm for the articulation of the arm, wherein the at least one hinge device is accommodated at least partially inside a first opening formed in the thickness of the lens.

18 Claims, 2 Drawing Sheets

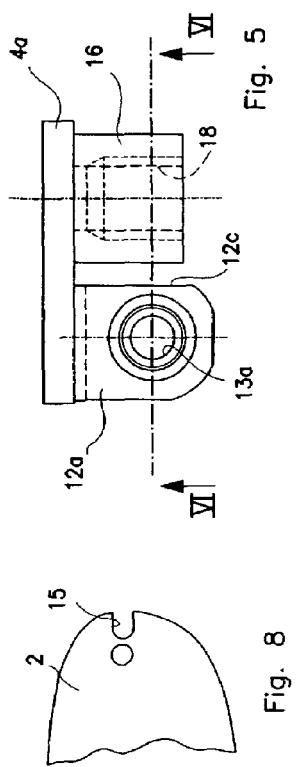
Fig. 5
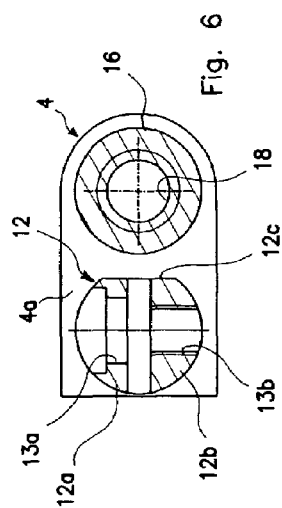
Fig. 6
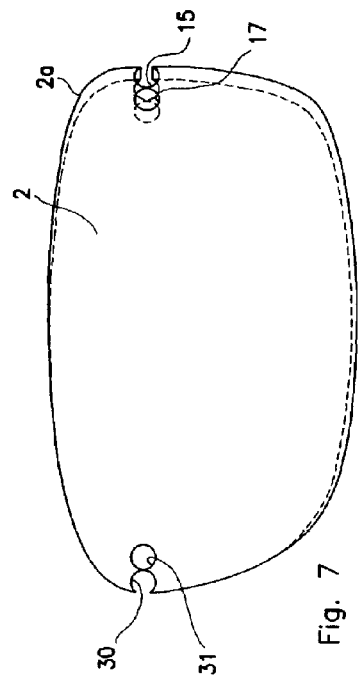
Fig. 7
Fig. 8
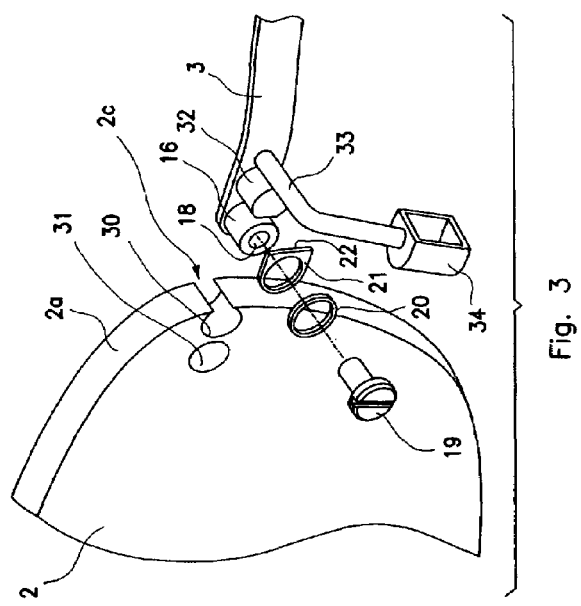
Fig. 3
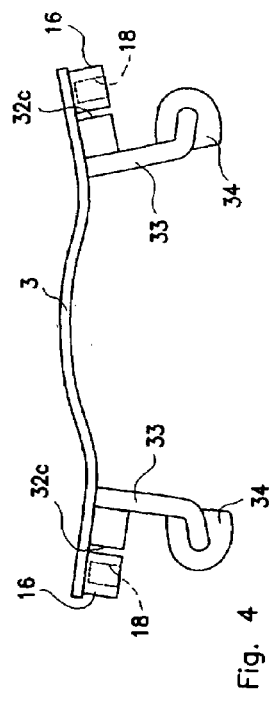
Fig. 4

SPECTACLES, PARTICULARLY OF THE TYPE WITHOUT-LENS-CARRYING RIMS

This application is a U.S. National Phase Application of PCT International Application PCT/IT2004/000539 which is incorporated by reference herein.

TECHNICAL FIELD

The present invention relates to spectacles, and more particularly, to spectacles without lens-carrying rims.

TECHNOLOGICAL BACKGROUND

The invention is applicable in particular in the specific field of spectacles without lens-carrying rims, in which the lugs for articulating the arms or the central connecting bridge for support on the nose are secured directly to the spectacle lens.

The known solutions typically provide holes or slot-form openings formed through the lens, at the location of the opposite lateral ends thereof, which are arranged to be engaged by screw tightening means in order to secure the lug elements, or the central bridge, to the lens. In particular, in the connection of the lug for articulating the arm to the lens, the corresponding hinge device is typically located outside the lens, in a position at a distance therefrom, more or less projecting from the front space occupied by the lens.

BRIEF DESCRIPTION OF THE INVENTION

The primary object of the present invention is to provide spectacles that are designed structurally and functionally to obtain greater overall compactness compared with the known solutions, and that in particular have more modest lateral space requirements and at the same time ensure sufficient reliability both in the locking of the lug (or bridge) to the lens and in the articulation of the arm to the lug of the spectacles.

That object and others too, which are demonstrated hereinafter, are achieved by the invention by means of spectacles comprising at least one lens, at least one lug for the articulation of an arm of the spectacles, which lug is connected directly to the lens, and at least one hinge device between the lug and the arm for the articulation of the arm, and the at least one hinge device is accommodated at least partially inside a first opening formed in the thickness of the lens.

BRIEF DESCRIPTION OF THE DRAWINGS

The features and advantages of the invention will become clearer from the following detailed description of a preferred embodiment thereof which is illustrated by way of non-limiting example with reference to the appended drawings in which:

FIGS. 2 and 3 are partly sectioned perspective exploded views of respective details of the spectacles of FIG. 1, FIG. 4 is a plan view on an enlarged scale of a detail shown partially in FIG. 3, FIG. 5 is a plan view on an enlarged scale of a detail of FIG. 2, FIG. 6 is a sectioned view taken on the line VI-VI of FIG. 5, FIG. 7 is a front elevational view of one of the lenses of the spectacles of the preceding Figures, FIG. 8 is a partial front elevational view of the lens of FIG. 7 in a variant.

PREFERRED EMBODIMENT OF THE INVENTION

Figure 1:
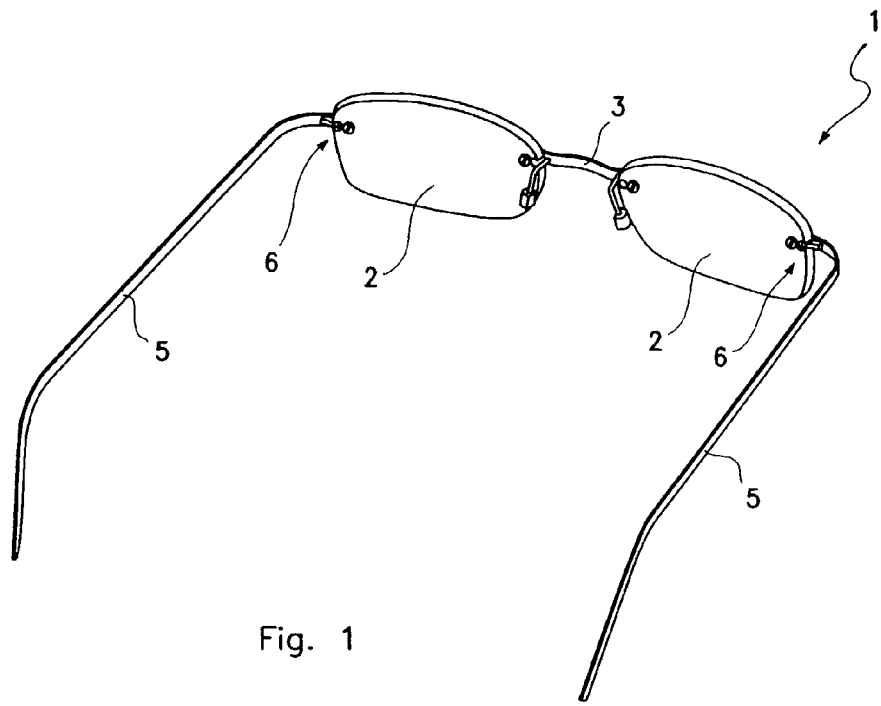
FIG. 1 is a perspective view of a pair of spectacles produced in accordance with the present invention.
Figure 2:
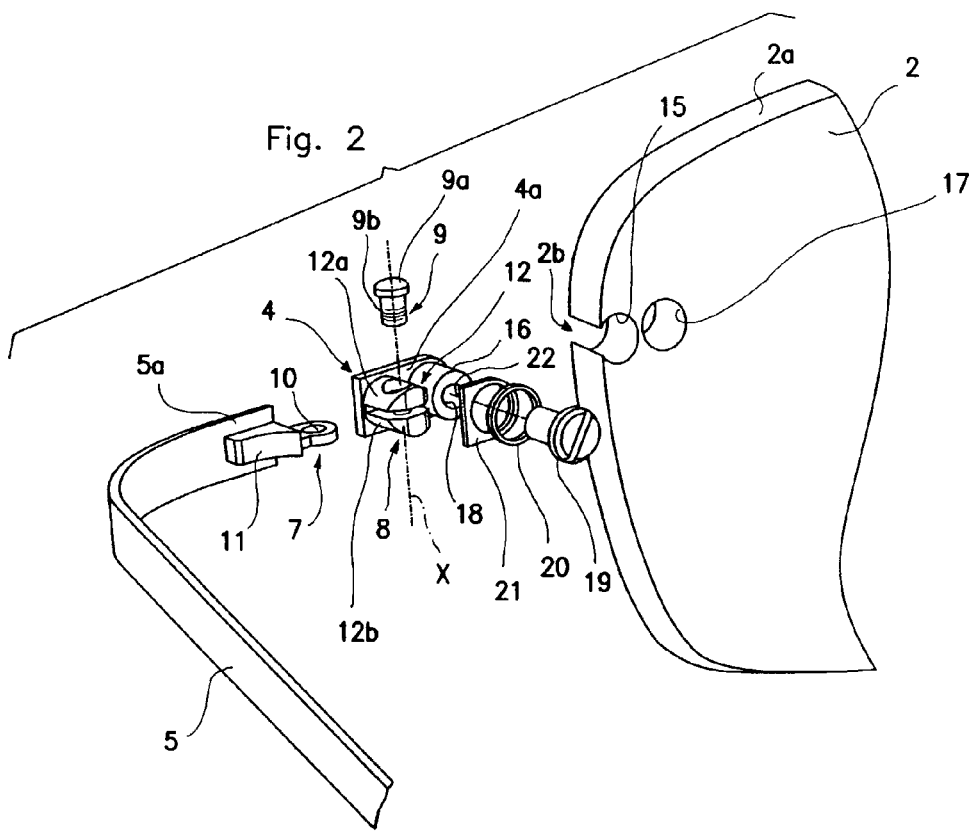

Referring to the mentioned drawings, spectacles produced in accordance with the present invention are generally indicated 1. As shown in FIGS. 1 and 2, the spectacles 1 are of the type without lens-carrying rims and comprise a pair of lenses 2 which are secured directly to a central connecting bridge 3 and also to respective lateral lugs 4 provided for the articulation of respective arms 5.

The system for securing only one of the lenses 2 to the spectacles will be described in detail hereinafter, it being understood that the system is structurally and functionally identical for the other lens, which is arranged in a reflectively symmetrical position.

Referring now to FIG. 2, each of the arms 5 is articulated to the corresponding lens 2 by means of a respective hinge device which is generally indicated 6 and which includes a first and a second hinge element, marked 7 and 8, respectively. The hinge elements are coupled to each other rotatably, about a hinge axis X, by means of a pin formation 9.

In more detail, the first hinge element comprises a body in the form of an eyelet 10 connected to the end 5a of the arm 5 by means of an attachment formation 11.

The second hinge element in turn comprises an appendage 12 rising from a plate-shaped base 4a of the lug 4 and including a pair of cheeks 12a, 12b which are juxtaposed and arranged at a distance from each other and between which the eyelet 10 can be accommodated. As best shown in FIGS. 5 and 6, respective through-holes 13a, 13b which are coaxial with each other and with the eyelet 10 (when the hinge device has been assembled) extend transversely through the cheeks 12a, 12b in order to permit hinged articulation by means of the pin formation 9. The hinge pin 9 is advantageously produced in the form of a screw having a head 9a and a shank 9b which is partially threaded and capable of screw engagement in the hole 13b which is in turn appropriately threaded. A widened seat in the hole 13a for accommodating the screw head 9a, substantially out of view, is also formed in the cheek 12a.

In accordance with a principal feature of the invention, and in reference to FIG. 2, the hinge device 6, in particular the assembly formed by the appendage 12, the eyelet 10 and the screw pin 9, is accommodated entirely within a through-hole opening 15 provided in the thickness of the lens 2. In more detail, the hole 15 is open at the lens edge 2a, defining an interrupted section 2b in the lens edge, through which section the attachment formation 11 of the eyelet 10 projects to the outside of the lens. The size of the interrupted section 2b of the lens edge is selected in such a manner that the attachment formation 11 and, with it, the arm 5, can have freedom of movement with respect to the lens, enabling the arm to rotate about the hinge axis X. It is alternatively provided that the hole 15 may be produced with a slot-shaped section, as illustrated, for example, in FIG. 8.

Preferably, the appendage 12 has a substantially cylindrical overall shape in order to be accommodated with reduced radial clearance in the opening 15 which is advantageously produced by drilling through the lens.

In order to lock the lug 4 on the lens 2, a further appendage 16 is provided which rises from the base 4a, in the same direction as and parallel with the appendage 12, and which is also arranged to engage a respective through-hole 17 extending through the lens in a position adjacent to the hole 15. The appendage 16 has a preferably cylindrical shape and is provided, on the side remote from the base 4a, with a threaded blind hole 18 for tightening a screw 19 for locking the lens on the lug.

A ring and a washer are indicated 20 and 21, respectively. The ring 20 is fitted onto the screw 19 and is interposed between the head of the screw and the surface of the lens (as shown in FIG. 2). The washer 21 is fitted on the appendage 16 of the lug 4 and is interposed between the internal surface of the plate-shaped base 4a of the lug 4 and the lens surface.

The ring 20 and the washer 21 are produced in resilient material in order to oppose any tensioning of the lens during the tightening of the screw 19.

It is also provided that the washer 21 is equipped with an edge 22 having a rectilinear profile suitable for engaging a corresponding flat surface 12c formed on the outside of the appendage 12. This structure of the washer 21 enables the contact surface between the washer and the surface of the lens to be increased compared with that which a simple annular washer would have, and the purpose of this increase in the contact surface is to improve the effect of opposing the tensioning of the lens during the tightening of the screw 19.

The components of the arm-lug assembly which are described above are produced in any suitable material, for example in metal material or in a metal alloy or in plastics material.

It will be appreciated that the arm-lug assembly has increased lateral compactness in the spectacles according to the invention due principally to the fact that the hinge device 6 is nested entirely within the hole 15 extending through the thickness of the lens and does not take up any space outside the lens.

The system described above for securing the lens to the articulation arm may advantageously also be used for securing the lens to the central bridge 3 for support on the nose. Referring to FIG. 3, in which components analogous to those described above are marked, where appropriate, with the same reference numerals, the lens is provided with a pair of further holes 30, 31 extending through the thickness of the lens and arranged in a position adjacent to each other. In this case too, the outer hole 30 is open at the lens edge 2a to define an interruption 2c in the edge. The hole 30 accommodates an appendage 32 which rises from the central bridge 3 and to which is connected a wire-like portion 33 having, at the other end, a structure 34 for the attachment of a small plate (not shown) for support on the nose. Typically, the structure 34 is constituted by an appendage which is Arranged to accommodate a small plate for support on the nose, which plate is articulated to the structure 34 by means of a screw. FIG. 7 illustrates the relationship between holes 15, 17, 30 and 31 in lens 2.

The wire-like portion 33 can be secured to the internal surface of the nose bridge 3 in a contiguous position with respect to the appendage 32 (as shown in FIGS. 3 and 4), or it can be secured directly to the flat surface of the appendage 32 facing the inside of the spectacles, the end of the wire-like portion 33 (facing the flat surface) being positioned centrally and coaxially with respect to the flat surface. The portion 33 may advantageously be welded to the appendage 32 or may be produced integrally therewith.

The lens 2 and the bridge 3 are locked relative to each other by means of a corresponding screw 19 engaged in the threaded blind hole 18 of an appendage 16 accommodated in the hole 31. There is also provision for the mounting of a packing ring 20 and a washer 21 having an anti-tensioning function in respect of the lens, as described above, in which a rectilinear edge 22 of the washer abuts an external flattened portion 32c of the cylindrical surface of the appendage 32.

The above-described components of the system for securing the lens to the central bridge may be produced in any suitable material, for example, in metal material, or in a metal alloy or in plastics material.

It will be appreciated that various other systems for securing the bridge 3 to the lens 2 may be used, although the one described represents a preferred choice because it involves greater overall uniformity, conferring on the spectacles structural homogeneity between the lateral regions for the attachment of the lugs and the central region for the attachment of the bridge.

The invention thus achieves the proposed objects, obtaining the above-mentioned advantages over the known solutions. In particular, greater overall lateral compactness of the spectacles may be mentioned. It should also be pointed out that the hinge screw for the articulation of the arm is held entirely inside the lens without, therefore, involving any risk of losing the spectacles during use owing to any loosening of the corresponding threaded coupling.

The invention claimed is:

1. Spectacles comprising at least one lens, at least one lug for the articulation of an arm of the spectacles, which lug is connected directly to the lens, and at least one hinge device between the lug and the arm for the articulation of the arm, and the at least one hinge device is accommodated at least partially inside a first opening formed in the thickness of the lens, wherein the at least one hinge device comprises first and second hinge elements which are rotatably coupled to each other by a respective pin formation, the hinge elements and the hinge pin formation being accommodated in the first opening in the thickness of the lens, the first hinge element and the second hinge element are connected to the arm and to the lug, respectively, and mutual locking means being provided between the lug and the lens, and the locking means comprise screw means capable of engaging a second opening extending through the lens in order to lock the lug relative to the lens, the first and second openings extending through the thickness of the lens in a position adjacent to each other.

2. The spectacles according to claim 1, wherein the first opening for accommodating the hinge device is formed through the thickness of the lens.

3. The spectacles according to claim 2, wherein the first hinge element and the second hinge element are connected to the arm and to the lug, respectively, and mutual locking means being provided between the lug and the lens.

4. The spectacles according to claim 2, comprising a central connecting bridge between lenses which comprises at each of its opposite ends a pair of appendages extending in the same direction from the bridge and capable of engaging a respective third and fourth opening extending through the lens.

5. The spectacles according to claim 1, wherein the first opening is also open at an edge of the lens, defining an interrupted section in the peripheral edge of the lens, one of the first and second hinge elements being extended to produce a formation for attachment to the corresponding arm, and the attachment formation extending through the interrupted section of the lens edge.

6. The spectacles according to claim 1, wherein the lug is for the articulation of the arm and comprises a plate-shaped base from which a first appendage and a second appendage rise in the same direction, the second appendage being accommodated in the first opening and locked with respect to the lens by the screw means, and the first hinge element being provided on the second appendage.

7. The spectacles according to claim 6, wherein the second appendage comprises a pair of juxtaposed cheeks between which an eyelet formation of the first hinge element can be accommodated, the cheeks being provided with respective transverse through-holes which are coaxial with each other and with the eyelet formation, in order to permit hinged articulation by the pin formation accommodated in the holes.

8. The spectacles according to claim 7, wherein the pin formation comprises a screw element arranged for screw engagement with the nut-screw provided in one of the holes extending through the cheeks.

9. The spectacles according to claim 1, comprising a central connecting bridge between lenses which comprises at each of its opposite ends a pair of appendages extending in the same direction from the bridge and capable of engaging a respective third and fourth opening extending through the lens.

10. The spectacles according to claim 9, wherein the third opening is also open at the edge of the lens, defining an interrupted section of the peripheral edge of the lens.

11. The spectacles according to claim 10, comprising at least one structure for the attachment of a small plate for support on the nose, which structure is located at the end of a wire-like portion extending from the bridge in a position contiguous with a first one of the pair of appendages which is adapted for accommodation in the third opening.

12. The spectacles according to claim 11, wherein the wire-like portion extends centrally and coaxially from a free end of the first one of the pair of appendages.

13. The spectacles according to claim 9, wherein the lug, the arm, the hinge device and the central bridge are produced in metal material or in a metal alloy.

14. The spectacles according to claim 9, wherein the lug, the arm, the hinge device and the central bridge are produced in plastics material.

15. The spectacles according to claim 1, wherein the lug, the arm and the hinge device are produced in metal material or in a metal alloy.

16. The spectacles according to claim 1, wherein the lug, the arm and the hinge device are produced in plastics material.

17. The spectacles according to claim 1, wherein the first opening for accommodating the hinge device is formed through the thickness of the lens.

18. The spectacles according to claim 1, wherein the first opening is also open at an edge of the lens, defining an interrupted section in the peripheral edge of the lens, one of the hinge elements being extended to produce a formation for attachment to the corresponding arm, and the attachment formation extending through the interrupted section of the lens edge.

* * * * *